Jan. 7, 1936.  C. A. VAN DUSEN  2,026,954
PIPE FITTING
Filed July 25, 1932  3 Sheets-Sheet 3
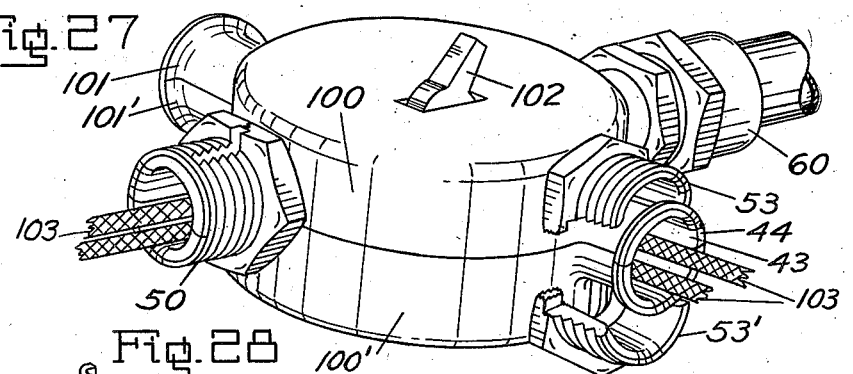
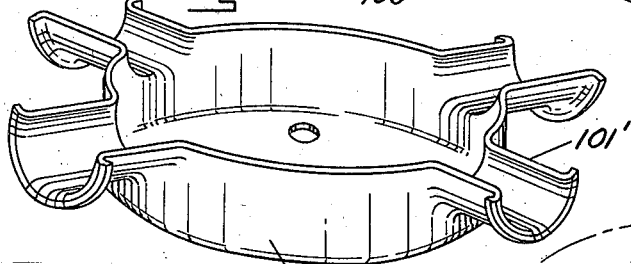
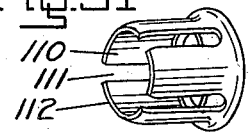
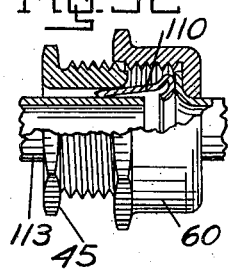
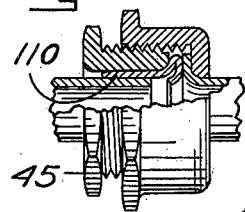
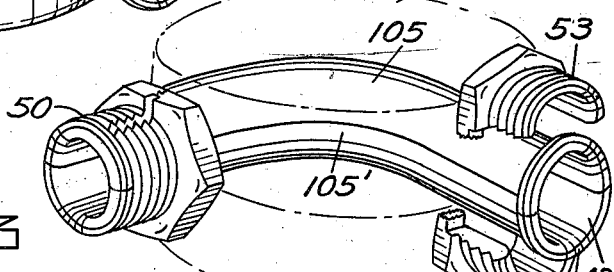
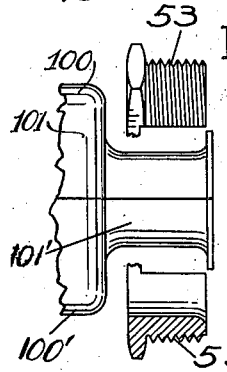
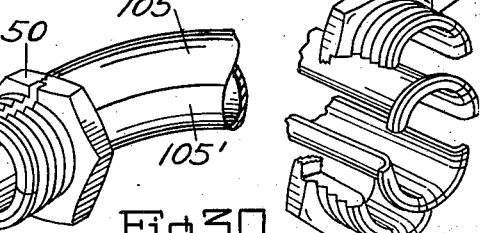
INVENTOR.
Charles A. Van Dusen
BY
W. B. Churcher
ATTORNEY.

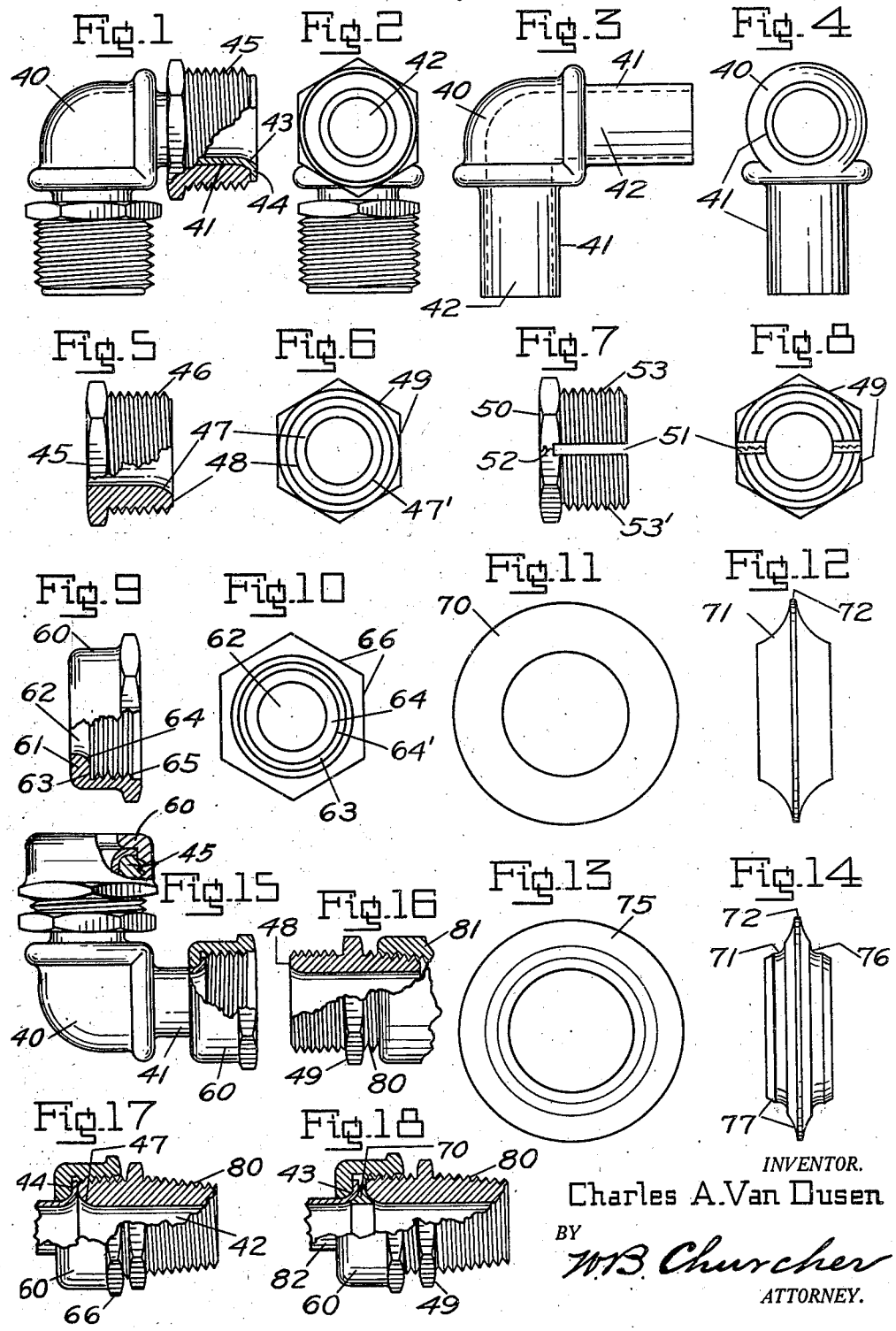

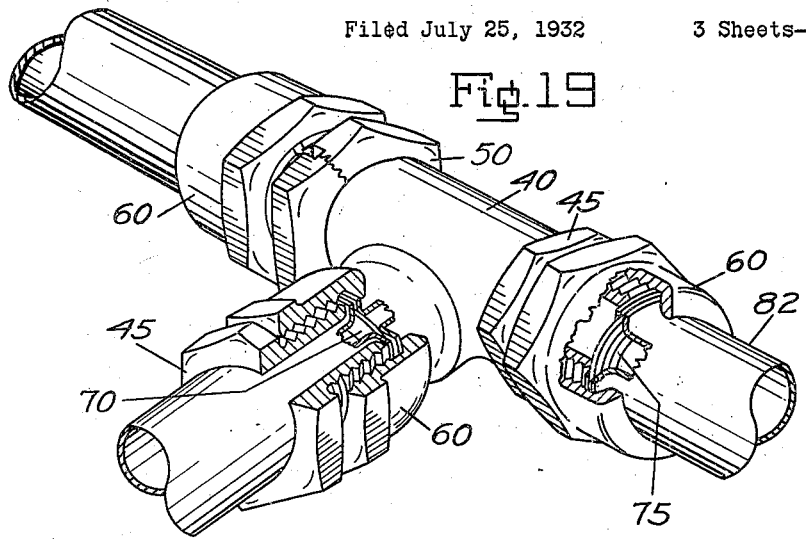
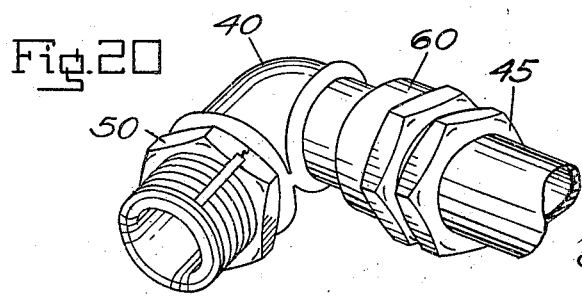
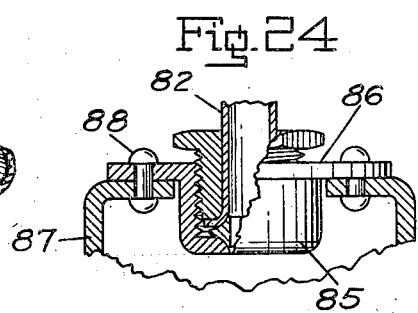
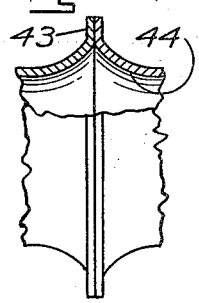
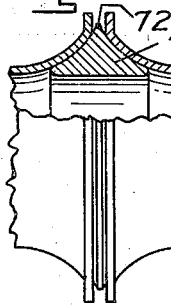
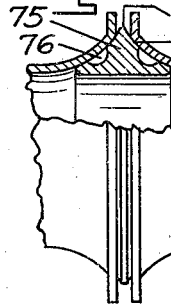
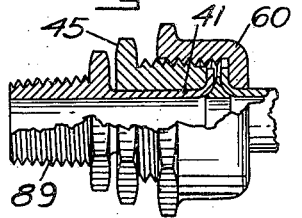
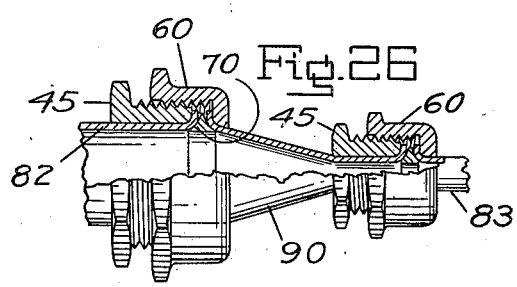

Patented Jan. 7, 1936

2,026,954

UNITED STATES PATENT OFFICE 2,026,954

PIPE FITTING

Charles A. Van Dusen, Baltimore, Md.

Application July 25, 1932, Serial No. 624,450

12 Claims. (Cl. 285—120)

My invention relates to fittings for making connections between the accessories that are ordinarily associated with pipes for distributing fluids, and with conduits for electrical conductors.

The many types of fittings heretofore available for conventional pipe lines and for conduits, particularly where light weight tubing is involved with intricate conditions of installation, are deficient in many important respects. Thin wall tubing is particularly difficult to install because it can be neither successfully bent to conform with a multiplicity of structural irregularities, nor threaded without becoming fragile, and therefore requires to be connected by fittings that are not only economically effective but that also can be efficiently serviced.

Systems for distributing fuel from storage tanks to valves, gauges, etc., require a wide variety of connections in which a considerable range of outlet diameters, or installation conditions, is involved. More or less inaccessible joints, particularly where they are angularly related, must be adapted for being easily tightened against leakage as well as easily separable for either servicing or subsequent installation of accessories with a minimum expenditure of either time or effort and without torsionally stressing the interconnecting pipe lines.

Systems for distributing electrical power require a wide range of outlet boxes and miscellaneous fittings all of which should be tight against the easy entrance of either water or explosive gases and yet provide for easy access to the conductors or the accessories with which they are assembled.

The fittings herein set forth are particularly effective for the fuel and electrical systems of aircraft wherein both lightness and efficient service together with a minimized fire hazard are highly important factors. Economy not only in manufacture and installation but also in service is promoted by features that promote interchangeability of companion parts in both types of fittings.

I provide each fitting with curvilinearly flared and radially flanged body portions for jointing with companion parts. The flange of either the fitting or tubing circumferentially reinforces the flared portion which otherwise is comparatively easy to fracture at the end when internally stressed, particularly where thin walls are involved or the material from which they are fabricated possesses insufficient ductility.

I provide a spacer packing ring for the fitting where used with liquids under pressure. The packing surfaces of the ring are annularly concaved to engage and annularly stress the flared portions of both the stub and pipe when clamped therebetween, the flanged portions being spaced more or less apart to thereby insure tightly wedged joints only at the packing surfaces of the ring. A joint that is tight against leakage of liquids may be unsatisfactory for highly volatile fluids and therefore, to meet the condition, I provide a packing ring having a plurality of annular recesses together with annular ridges each having a restricted surface that develops a high unit pressure when clamped between the flared portions of companion stubs or pipes by means of companionly threaded collars, one of which may be longitudinally split, each of which is provided with an end portion that is chamfered to a diameter less than the apex or root diameter of the respective threads in order to permit of interchangeability under variable service conditions as provided for herein.

A joint for electric conduits need not be wholly leak proof and therefore the packing rings may be omitted in favor of a face to face joint between the flanges of the fittings and conduits. The flange joint is sufficient to prevent easy access of moisture to the interior of the conduit and also it provides mechanical strength against loosening by vibration, whereas a packing ring in a conduit system, because of the conductors, would prevent removal of an associated fitting. Omission of the rings, where conditions permit, therefore conserves both weight and cost while promoting simplicity of installation and reducing the stock of parts heretofore required to service both types of systems.

Conditions sometimes arise under which a conduit cannot be conveniently formed at the ends and therefore I provide a flared and flanged sleeve that is adapted to be constricted to a plain ended conduit and connected to either of the fittings depicted by several of the drawings' figures.

Moreover, conventionally threaded fittings cannot always be made leakproof when tightened at the desired angle but the herein described system of fittings can be effectively tightened either to obtain a leakproof joint or to relieve the stresses that sometimes develop either while making the installation or in service.

I provide one piece bodies for either fluids or electric conductors, and separable companion piece bodies for electric conductors, switches, protective devices, etc., either type being basically interchangeable. The body portions of the fittings are fabricated from ductile material, such as brass, steel, or aluminum in the form of sheets or forgings, to facilitate the final forming operations, conserve weight, and reduce both the manufacturing and service costs to a minimum. Conventional castings are not only comparatively heavy but they also lack ductility and therefore are not adapted to the fabrications herein set forth.

The accompanying drawings illustrate the herein described fittings and they also depict their adaptability as well as interchangeability under a wide variety of both installation and service conditions.

Fig. 1 is a side view partly in section, of a basic fitting that embodies the salient features of my invention.

Fig. 2 is an end view of the fitting shown in Figure 1.

Fig. 3 is a side view of a blank, preferably a forging, from which the body portion of Figure 1 can be fabricated.

Fig. 4 is an end view of the blank shown in Figure 3.

Fig. 5 is a side view, partly in section, of a collar having an exteriorly threaded portion that is internally chamfered.

Fig. 6 is an end view of the collar shown in Figure 5, a portion of the surface adjacent to the threads being chamfered at the orifice.

Fig. 7 is a side view of a ferrule comprising the collar shown in Figure 5 when longitudinally divided into a plurality of companion portions.

Fig. 8 is an end view of the ferrule shown in Figure 7.

Fig. 9 is a side view, partly in section, of a collar having an internally threaded portion together with a restricted end portion that is chamfered at the interior orifice in companion relation to the chamfered end surface of the collar shown in Figure 5.

Fig. 10 is an end view of the collar shown in Figure 9.

Fig. 11 is a plan view of a spacer packing ring shown in certain after occurring figures.

Fig. 12 is an edge view of the ring shown in Figure 11.

Fig. 13 is a plan view of a recessed spacer packing ring shown in an after occurring figure.

Fig. 14 is an edge view of the ring shown in Figure 13.

Fig. 15 is a side view, partly in section, of a fitting that includes the basic features of both Figures 1 and 9.

Fig. 16 is a view, partly in section, of an adapter fitting to connect a fitting, such as that shown in Figure 15, to a standard pipe threaded outlet.

Fig. 17 is a view, partly in section, of the fitting shown in Figure 16 when assembled with the fitting shown in Figure 15, or with a flared and flanged pipe, the flange being jointed in face to face relation with the unchamfered end surface of the fitting.

Fig. 18 is a view, partly in section, of the fitting shown in Figure 16 when assembled with either the fitting shown in Figure 15, or a flared and flanged pipe, together with a ring such as that shown in Figure 12, the ring being in jointed relation with the flared portion of the pipe and the chamfered portion of the fitting.

Fig. 19 is a perspective view, partly in section, of a three way adaptation of the basic fitting shown in Figures 1 and 15.

Fig. 20 is a perspective view of a two way adaptation of the basic features of the fitting shown in Figures 1 and 15, the divided collar or ferrule shown in Figure 7 being substituted for the collar shown in Figure 5.

Fig. 21 is an enlarged view, partly in section, showing portions of two flared and flanged pipes, the flanges being in face to face abutting relation.

Fig. 22 is an enlarged view, partly in section, of the pipes shown in Figure 21 together with the ring shown in Figure 12, the flared portions of the pipes being in abutting relation with the concave surfaces of the ring, and the flanged portions being in spaced apart relation.

Fig. 23 is an enlarged view, partly in section, of the pipes of Figure 21 together with the ring shown in Figure 14, the flared portions of the pipes being in abutting relation with the recessed concave surfaces of the ring, and the flanged portions being in spaced apart relation.

Fig. 24 is a view, partly in section, of an outlet fitting that includes either the collar or ferrule shown in Figures 5 and 7 together with the ring shown in Figure 12, the flared and flanged end of a pipe and the chamfered portion of the fitting being joined in fluid tight relation with the ring.

Fig. 25 is a view, partly in section, of an adapter fitting that includes either the collar or ferrule shown in Figures 5 and 7 together with the ring shown in Figures 12, the flared and flanged end of a pipe and of the fitting being joined in fluid tight relation with the ring.

Fig. 26 is a view, partly in section, of a reducing fitting that includes either the collar or ferrule shown in Figures 5 and 7 together with the ring shown in Figure 12, the flared and flanged ends being in jointed relation with pipes of different diameters.

Fig. 27 is a perspective view of a separable outlet box in which the basic features of Figures 1 and 7 are incorporated for accessibly mounting certain of the accessories customarily associated with electrical systems.

Fig. 28 is a perspective view of one of a pair of companion stampings that comprises the body portion of Figure 27.

Fig. 29 is a phantom view of the body portion shown in Figure 27 together with a bend that is an adaptation of the fitting shown in Figure 1 to promote interchangeability in an electrical conduit system, the bend being longitudinally divided into companion halves.

Fig. 30 is a perspective view of the bend shown in Figure 29, together with the ferrule of Figure 7, a portion of the bend being broken and the parts separated from one another to more clearly portray the salient features.

Fig. 31 is a perspective view of the flared, flanged, and slotted sleeve element shown in later figures.

Fig. 32 is a view partly in section, of a fitting comprising the sleeve element shown in Figure 31 together with the companion collars shown in Figures 5 and 9, these elements being in process of joining a flared and flanged conduit with a conduit having a plain end.

Fig. 33 is a view of the fitting and conduits shown in Figure 33, the several elements being in clamped together relation.

Fig. 34 is a view, partly in section, of an adaptation of the fitting shown in Figure 26, the tapered portion being longitudinally divided into companion halves.

Referring to the drawings:

Fittings substantially as shown in Figure 1 together with the complementary parts shown in the accompanying figures embody the salient features of the present invention. Body 40 and stub 41 have a through passage 42. The body and stub are integrally fabricated from ductile material so that the end of the stub can be formed in companion relation to the contour of an end of a collar, or ferrule when they are assembled in rotatable relation, the formed end being shown at 43—44. Collar 45 is externally threaded at 46 and chamfered at 47, chamfer disc 47' being substantially less than the root diameter of the thread so that a radially disposed surface is provided at 48. The forming operation therefore both flares and flanges the stub at 43—44 respectively. The flare eliminates an otherwise sharp corner at the orifice of passage 42 and also provides for the circumferentially tensioned joints shown in certain of the drawings. The flange effectively reinforces the flared portion against the stresses caused by packing the joint, and also provides for a face to face joint where conditions of installation or service will permit. A hexagonal portion 49 is provided to facilitate threading with companion fittings.

Certain of the fittings hereinafter described require that collar 45 be divided into a plurality of matched parts, and when so divided it comprises ferrule 50. A dividing slot 51 extends to the hexagonal portion, 52 being the line of cleavage when collar 45 is divided into parts 53—53'. The cleavage also serves to maintain the threads in alignment while engaging with a companion part such as 60 or 85.

Collar 60 has a restricted end portion 61 having an orifice 62 and a radially disposed interior surface 63 that is convexly chamfered at 64, chamfer disc 64' being substantially less than the apexal diameter of threads 65. The collar is adapted for threadable engagement with either collar 45 or ferrule 50, chamfer 47 then being in opposed relation to chamfer 64 while radial surface 48 is in face to face relation with surface 63, but when the divided collar, or ferrule, is assembled on stub 41 then flare 43 is in opposed relation to chamfer 64 while flange 44 engages radial surface 63. A hexagonal portion is provided at 66 to facilitate threading with companion fittings.

Spacer packing ring 70 is provided for either of the fittings when used with liquids. Annularly concaved surfaces 71 are provided to pack the joint at 43—47—64 and a spacer portion 72 is provided to separate either flanges 44 or radial surfaces 48—63 from each other.

Spacer packing ring 75 is provided in lieu of ring 70 when the joint is involved with abnormally volatile fluids. Concave surfaces 71 are provided with recesses 76 that are separated by ridges 77. The ridges provide a high unit pressure at the joint with flared surface 43 and chamfered surfaces 47—64, the recesses serving to confine a joint compound when required by the conditions of installation.

Certain installations hereinafter described either do not require a packing ring or one cannot be successfully inserted. Omission of the ring permits face to face contact of flanges 44 or of radially disposed surfaces 48—63, flare 43 then being in opposed relation to either chamfer 47 or 64 so that there is no obstruction to drawing of electrical conductors through the joint. Flange 44 circumferentially reinforces flared portion 43 and also serves to insure a mechanically secure joint that will not loosen by vibration when the contiguous flanges are clamped together by either companion parts 45—60 or 50—60.

The accessories ordinarily associated with piping systems have conventionally threaded outlets and therefore I provide suitable adapters to connect them to the fittings herein described as well as to either pipes or conduits having companion formed ends.

Body 80 shown in Figure 16 is conventionally threaded for engagement with an outlet such as 81 but otherwise conforming with the basic features of Figure 1 to connect a fitting such as shown in Figures 15, 17, and 18.

Tanks require outlets that are adapted for connection to the associated system. Body 85 shown in Figure 24 includes the features of stub 41, collars 45 and 60 and either ring 70 or 75, together with a circumferential portion 86 that can be fastened to a tank wall 87 as by riveting at 88.

Body 89 shown in Figure 25 has a threaded portion and a flared and flanged stub portion 41 together with collar 45, or ferrule 50, and collars 60 that are collectively adapted to connect a conventionally threaded outlet to either a pipe or fitting having a flared and flanged end.

The reducing coupling shown in Figure 26 is provided where pipes or fittings of different diameters are to be connected to each other. The flared and flanged ends of pipes 82—83, or of a stub 41, and of tapered tube 90 together with collars 45—60, and rings 70 are assembled in cooperative relation. Ring 75 can be substituted for 70, or the ring can be omitted to provide a face to face joint at the flanges, where service conditions permit.

A fitting that is suitable for both housing an electrical accessory and connecting it to the associated system is indicated at 100—100', the two halves being separable provides accessibility to an accessory and the associated conductors. The portions of the body that correspond to stub 41 of body 40 are indicated at 101—101', the halves of both body and stubs are fastened together by ferrule 50 and collar 60. Stub halves 101—101' are flared and flanged similarly to the corresponding parts of body 40, the difference being that both the body and stubs are preferably formed of stampings so that the entire assembly including accessory 102 can be replaced by a composite bend without it being necessary to sever conductors 103, companion halves 105—105' being of the same overall dimensions as body 100.

Conditions of installation some times make it impracticable to form an end of a conduit in companion relation to either collar 45, 50, or 60 and therefore a slotted sleeve is provided. The jointing end of sleeve 110 is formed in companion relation to flare 43 and flange 44, the opposite end being provided with slots 111 and lips 112 to facilitate constricting the portions adjacent the slots to a plain end pipe 113, the assembly including collars 45 and 60 being shown in Figures 32 and 33.

The reducing coupling shown in Figure 34 is provided to connect either conduits or outlets of different diameters to each other. Tapered tube 115—115' is fabricated in companion halves and divided collar or ferrule 50 is substituted for collar 45 so that the coupling can be either installed or removed, or can be exchanged with a different fitting such as is depicted by Figures 27 and 29, for example, without it being necessary to sever conductors 103.

The foregoing description together with the drawings makes it evident that the invention provides highly effective as well as economical and efficient fittings that are interchangeably adaptable to the wide variety of conditions which are encountered with installations of either piping for fluids or conduits for electrical equipment, and also that many variations within the scope of the appended claims can be made by one skilled in the allied arts.

I claim:

1. An article of manufacture including in operative relation: a hollow body having an extending tubular stub; a collar having an externally threaded portion and an internally chamfered portion; said collar being mounted upon said stub in concentrically rotatable relation, the chamfer being remote from said body, and the end of the stub remote from the body then being flared in companion relation to the chamfered surface, the disc of the flared surface being less than the diameters at the root and at the apex of the threads, and the flared surface being radially extended to develop a flange.

2. An article of manufacture including in operative relation: a hollow body having an extending tubular stub; a pair of collars having companion threaded portions, each collar having an internally chamfered end portion; one of said collars being mounted upon said stub in concentric relation, the chamfer being remote from said body, and the end of the stub remote from the body then being flared in companion relation to the chamfered surface, the disc of the flared surface being less than the diameters at the root and at the apex of the threads, and the flared surface being radially extended to develop a flange; a packing ring having a plurality of annularly concaved packing surfaces, the surfaces being adapted for seating with said chamfered surface and said flared surface in companion relation; said ring being interposed between the chamfer of said collar and the flared surface of said stub in coaxial relation, said radially extended surfaces then being in spaced apart relation; and said collars threaded together in clamping relation to said stub and said packing ring.

3. An article of manufacture including in operative relation: a hollow body having an extending tubular stub, said body and stub being divided into companion halves; a longitudinally divided collar having an externally threaded portion and an internally chamfered portion, the chamfer surface being radially extended; said divided collar being mounted upon said stub in concentric relation, the chamfer being remote from said body, and the end of said stub remote from said body being formed in companion relation to the surface of the chamfered end of said collar; and a collar having an internally threaded portion and an internally chamfered portion, the chamfer disc diameter being less than the apex diameter of the threads, and the chamfer surface being radially extended; said collars being adapted for thread engagement with each other; the chamfered portions of said stub and of said internally threaded collar being in coaxial opposed relation, and the radial surface of said stub and the radial surfaces of said collars being in clamped together relation when the collars are threaded together.

4. An article of manufacture including in operative relation: a hollow body having an extending tubular stub, said body and stub being divided into companion halves; a longitudinally divided collar having an externally threaded portion and an internally chamfered portion, said divided collar being mounted upon said stub in concentric relation, the chamfer being remote from said body, and the end of said stub remote from said body being flared in companion relation to the chamfered surface of said collar, the flared surface being radially extended; a collar having an internally threaded portion and an internally chamfered portion, the chamfer disc diameter being less than the apex diameter of the threads, and the chamfer surface being radially extended; said collars being adapted for thread engagement with each other; a tapered tube having a flared and flanged end for engagement with the radial surfaces of said stub and said internally threaded collar, said tube being longitudinally divided into companion halves, the chamfered portions of said stub and of said internally threaded collar being in coaxial opposed relation, and the radial surface of said stub, of said tube, and of said collars being in clamped together relation when the collars are threaded together.

5. An article of manufacture including in operative relation: a hollow body of ductile metal having at least one extending tubular stub; a collar of a length materially less than that of said stub and having a threaded portion together with an internally chamfered portion; said collar being mounted upon said stub in concentrically rotatable relation with the chamfer remote from said body and the end of the stub remote from the body being flared in companion relation to the chamfered surface for securing said collar on said stub while permitting longitudinal movement thereon, and said flared surface being radially extended to develop a flange.

6. An article of manufacture including in operative relation: a hollow body ductile metal having at least one extending tubular stub, the diameter of said stub being materially smaller than the adjacent cross-section of said body; a collar having a threaded portion and an internally chamfered portion, the length of said collar being less than that of said stub; said collar being mounted upon said stub in concentrically rotatable relation with the chamfer remote from said body, and the end of the stub remote from the body being flared in companion relation to the chamfered surface for securing said collar on said stub while permitting longitudinal movement thereon; and said flared surface being radially extended to develop a flange.

7. An article of manufacture including in operative relation: a hollow body of ductile metal having a plurality of angularly extending tubular stubs; a collar for each of said stubs, each collar having a threaded portion and an internally chamfered portion; said collars being mounted upon said stubs in concentrically rotatable relation with the chamfers remote from said body, and the end of at least one of said stubs remote from the body being flared in companion relation to the respective chamfered surface for securing said collars on said stubs while permitting longitudinal movement thereon; and each of said flared surfaces being radially extended to develop a flange.

8. An article of manufacture including in operative relation: a hollow body of ductile metal having a plurality of extending tubular stubs, the diameters of said stubs being materially smaller than the adjacent cross-section of said body; a collar for each of said stubs, each collar having a threaded portion and an internally chamfered portion; at least one of said collars being materially shorter than a stub and mounted thereon in concentrically rotatable relation with the chamfers remote from said body, and the end of each stub from the body being flared in companion relation to the respective chamfered surface for securing said collars on said stubs, while permitting longitudinal movement thereon; and each of said flared surfaces being radially extended to develop a flange.

9. An article of manufacture including in operative relation: a hollow body having at least one tubular portion; an externally threaded collar having an internally chamfered end portion, the chamfer diameter being less than the root diameter of the threads; said collar being mounted upon said tubular portion in concentric relation with the chamfer remote from said body; the end of said tubular portion remote from said body being flared in companion relation to the chamfer of said collar and radially extending; an internally threaded collar having a restricted orifice that is internally chamfered, the disc diameter of the chamfer being less than the apex diameter of the threads; said collars being adapted for thread engagement with each other; a tapered tube having at least one flared and flanged end, the flange being adapted for engagement with the radially extending surfaces of said collar and of said tubular portion, the radially extending surface of said tubular portion and of said tapered tube as well as of said collars being in clamped together relation and the chamfers of said tubes being in opposed relation when assembled with one another.

10. An article of manufacture including in operative relation: a hollow body having at least one tubular portion; an externally threaded collar having an internally chamfered end portion, the chamfer diameter being less than the root diameter of the threads; said collar being mounted upon said tubular portion in concentric relation with the chamfer remote from said body; the end of said tubular portion remote from said body being flared in companion relation to the chamfer of said collar and radially extending; an internally threaded collar having a restricted orifice that is internally chamfered, the disc diameter of the chamfer being less than the apex diameter of the threads; said collars being adapted for thread engagement with each other; a packing ring; a tapered tube having at least one flared and flanged end, the flare being adapted for engagement with the packing surfaces of said ring as well as with the chamfer of said collar; the chamfer of said tubular portion and of said tapered tube being in clamped together relation with the packing surfaces of said ring and the chamfers of said collars, the flanges of said tubular portion and said tapered tube being in opposed relation when assembled with one another.

11. An article of manufacture including in operative relation: a hollow body having at least one extending tubular stub, said body together with said stub being divided into companion halves: a threaded ferrule having an internally chamfered end portion, the chamfer diameter being less than the root diameter of the threads; said ferrule being mounted upon said stub in concentrically divided relation with the chamfer remote from said body; the end portion of said stub remote from said body being flared in companion relation to the chamfer of said ferrule and radially extending; an internally threaded collar having a restricted orifice that is internally chamfered, the disc diameter of the chamfer being less than the apex diameter of the threads; said ferrule and said collar being adapted for thread engagement with each other; a longitudinally divided tapered tube having at least one flared and flanged end, the flange being adapted for engagement with the radially extending surfaces of said collar and of said stub; the radially extending surface of said stub and of said tube as well as of said ferrule and said collar being in clamped together relation and the chamfers of said stub and said tube being in opposed relation when assembled with one another.

12. An article of manufacture including in operative relation: a hollow body having at least one extending tubular stub, said body together with said stub being divided into companion halves; a threaded ferrule having an internally chamfered end portion, the chamfer diameter being less than the root diameter of the threads; said ferrule being mounted upon said stub in concentrically divided relation with the chamfer remote from said body; the end portion of said stub remote from said body being flared in companion relation to the chamfer of said ferrule and radially extending; an internally threaded collar having a restricted orifice that is internally chamfered, the disc diameter of the chamfer being less than the apex diameter of the threads; said ferrule and said collar being adapted for thread engagement with each other; the radially extending surfaces of said stub and of said ferrule and said collar being in clamped together relation and the chamfers of said stub and said collar being in opposed relation when assembled with one another.

C. A. VAN DUSEN.